US012580882B2

(12) United States Patent
Hiran et al.

(10) Patent No.: US 12,580,882 B2
(45) Date of Patent: Mar. 17, 2026

(54) ELECTRONIC MESSAGING COMMUNICATION DELIVERY METHOD

(71) Applicant: Freshworks Inc., San Mateo, CA (US)

(72) Inventors: Suvrat Hiran, Jaipur (IN); Shubham Bansal, Jaipur (IN); Abhishek Pal, Gorakhpur (IN); Swaminathan Padmanabhan, Chennai (IN); Shivam Singh, Prayagraj (IN); Pranjal Yadav, Bangalore (IN)

(73) Assignee: Freshworks Inc., San Mateo, CA (US)

( * ) Notice: Subject to any disclaimer, the term of this patent is extended or adjusted under 35 U.S.C. 154(b) by 0 days.

(21) Appl. No.: 18/295,196

(22) Filed: Apr. 3, 2023

(65) Prior Publication Data

US 2024/0333674 A1     Oct. 3, 2024

(51) Int. Cl.
| | |
|---|---|
| *H04L 51/226* | (2022.01) |
| *G06Q 30/0241* | (2023.01) |
| *G06Q 30/0242* | (2023.01) |
| *G06Q 30/0251* | (2023.01) |
| *G06Q 50/34* | (2012.01) |

(52) U.S. Cl.
CPC ....... H04L 51/226 (2022.05); *G06Q 30/0244* (2013.01); *G06Q 30/0271* (2013.01); *G06Q 30/0277* (2013.01); *G06Q 50/34* (2013.01)

(58) Field of Classification Search
CPC .............. H04L 51/226; G06Q 30/0244; G06Q 30/0271; G06Q 30/0277
See application file for complete search history.

(56) References Cited

U.S. PATENT DOCUMENTS

| | | | | |
|---|---|---|---|---|
| 7,475,116 | B2 | 1/2009 | Hay | |
| 9,088,533 | B1 | 7/2015 | Zeng et al. | |
| 2003/0037041 | A1* | 2/2003 | Hertz ..................... | H04N 7/163 |
| | | | | 348/E7.071 |
| 2012/0191546 | A1* | 7/2012 | Phelan ............... | G06Q 30/0271 |
| | | | | 705/14.66 |
| 2016/0212266 | A1* | 7/2016 | Soundar ................ | H04M 3/523 |
| 2017/0011420 | A1* | 1/2017 | Sullivan ............ | G06Q 30/0277 |
| 2017/0140023 | A1* | 5/2017 | Modarresi ............ | G06F 16/285 |
| 2018/0097759 | A1* | 4/2018 | Brechbuhl ........ | G06F 16/24578 |
| 2018/0146253 | A1* | 5/2018 | Louboutin ............ | H04L 67/535 |
| 2020/0311487 | A1* | 10/2020 | He ........................ | G06F 40/279 |
| 2022/0245446 | A1* | 8/2022 | Mitra ...................... | G06N 3/04 |
| 2023/0252478 | A1* | 8/2023 | Saleh ................. | G06Q 20/4016 |
| | | | | 705/44 |

OTHER PUBLICATIONS

Pal, Abhishek, et al. "Dynamic Best Send Time Prediction for Marketing Email Campaigns." 2022 International Joint Conference on Information and Communication Engineering (JCICE). IEEE. (Year: 2022).*

(Continued)

*Primary Examiner* — John M Macilwinen
(74) *Attorney, Agent, or Firm* — LeonardPatel PC; Michael A. Leonard, II; Sheetal S. Patel

(57) ABSTRACT

In order to predict an optimized send time for one or more end users in an email campaign, one or more times in a day are identified for sending the email campaign to the one or more end users. The email campaign may then be transmitted at one of the one or more times identified to the one or more end users.

18 Claims, 5 Drawing Sheets

(56)                    References Cited

OTHER PUBLICATIONS

Abe, Naoki, et al. "Cross channel optimized marketing by reinforcement learning." Proceedings of the tenth ACM SIGKDD international conference on Knowledge discovery and data mining. (Year: 2004).*

Ma, Xiao, Shen-Yi Zhao, and Wu-Jun Li. "Clustered reinforcement learning." arXiv preprint arXiv:1906.02457. (Year: 2019).*

Ryu, Sanghyun, et al. "User adaptive recommendation model by using user clustering based on decision tree." 2010 10th IEEE International Conference on Computer and Information Technology. IEEE. (Year: 2010).*

Luo, Xiao, et al. "Predictive analysis on tracking emails for targeted marketing." Discovery Science: 18th International Conference, DS 2015, Banff, AB, Canada, Oct. 4-6, 2015. Proceedings 18. Springer International Publishing. (Year: 2015).*

Conceição, Andreia, and João Gama. "Main factors driving the open rate of email marketing campaigns." Discovery Science: 22nd International Conference, DS 2019, Split, Croatia, Oct. 28-30, 2019, Proceedings 22. Springer International Publishing. (Year: 2019).*

Paralič, Ján, TomáKaszoni, and Jakub Mačina. "Predicting suitable time for sending marketing emails." Information Systems Architecture and Technology: of ISAT 2019: Part II. (Year: 2019).*

Sinha, Moumita, Vishwa Vinay, and Harvineet Singh. "Modeling time to open of emails with a latent state for user engagement level ." Proceedings of the Eleventh ACM International Conference on Web Search and Data Mining. (Year: 2018).*

Araújo, Carolina, et al. "A novel approach for send time prediction on email marketing." Applied Sciences 12.16. (Year: 2020).*

\* cited by examiner

Figure 1:
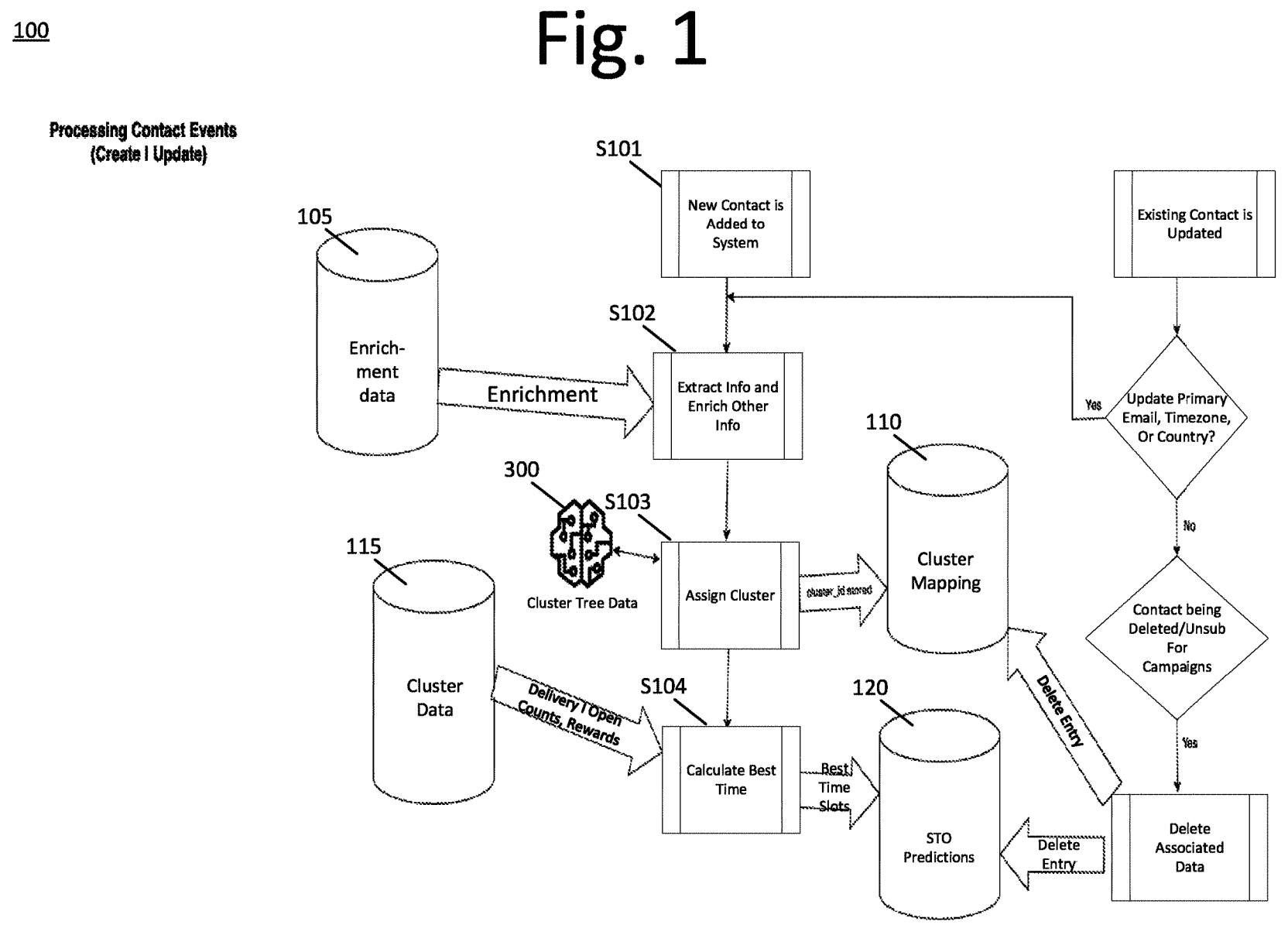

Processing Contact Events
(Create / Update)

S101 — New Contact is Added to System

Existing Contact is Updated

Update Primary Email, Timezone, Or Country? — Yes / No

Contact being Deleted/Unsub For Campaigns — Yes

Delete Associated Data

S102 — Extract Info and Enrich Other Info

105 — Enrich-ment data

Enrichment

S103 — Assign Cluster

300 — Cluster Tree Data

110 — Cluster Mapping

Delete Entry

Delete Entry

120 — STO Predictions

S104 — Calculate Best Time

Best Time Slots

115 — Cluster Data

Delivery/Open Counts, Rewards

Processing Email Events
(Delivered I Open )

Start

S505 — Identifying one or more times in a day for sending the email campaign

S510 — Transmitting the email campaign at one of the one or more times identified End

500

ELECTRONIC MESSAGING COMMUNICATION DELIVERY METHOD

FIELD

The present invention relates to electronic mail (email) communication, and more particularly, to a technique to determine the best time to send an email communication to an end user.

BACKGROUND

In existing email communication systems, optimal target time for each user is calculated based on a statistical analysis of the user's past communication. For example, each user is targeted by different campaigns at different static time intervals of a day defined by the marketers heuristically. Based on this data, the optimal time of a user is the time with the highest engagement rate compared to other time intervals over a period.

This computation turns out to be sender biased, as the time intervals to target are defined by the sender. For example, all the time intervals of a day are not explored by the virtue of how the email campaigns are set up, which further deletes data points and adds bias. Additionally, with new users, predictions are not available due to lack of previous communication data.

Accordingly, an improved email communication technique may be beneficial.

SUMMARY

Certain embodiments of the present invention may provide solutions to the problems and needs in the art that have not yet been fully identified, appreciated, or solved by current email communication systems. For example, some embodiments of the present invention pertain to a dynamic and adaptable system configured to predict optimized send time for each end user in an email campaign.

In an embodiment, a computer-implemented method for predicting an optimized send time for one or more end users in an email campaign includes identifying one or more times in a day for sending the email campaign to the one or more end users, and transmitting the email campaign at one of the one or more times identified to the one or more end users.

In another embodiment, a system configured to predict an optimized send time for one or more end users in an email campaign. The system includes memory comprising a set of instructions and at least one processor. The set of instructions are configured to cause at least one processor to execute identifying one or more times in a day for sending the email campaign to the one or more end users, and transmitting the email campaign at one of the one or more times identified to the one or more end users.

In yet another embodiment, a computer program, which is embodied on a non-transitory computer-readable medium, is configured to predict an optimized send time for one or more end users in an email campaign. The computer program is configured to cause at least one process to execute identifying one or more times in a day for sending the email campaign to the one or more end users, and transmitting the email campaign at one of the one or more times identified to the one or more end users.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a method configured to create and update an end user contact information, according to an embodiment of the present invention.

FIG. 2 is a flow diagram illustrating a method for updating a recommended send time for email addresses associated with one or more end users, according to an embodiment of the present invention.

FIG. 4 is an architectural diagram illustrating a computing system configured to determine the best time to send an email communication to an end user, according to an embodiment of the present invention.

DETAILED DESCRIPTION OF THE EMBODIMENTS

Some embodiments generally pertain to a dynamic and adaptable system configured to predict optimized send time for each end user in an email campaign. In some embodiments, the system identifies one or more times in a day and over a week that are most suited for an end user to receive, and transmit email communications at the one or more identified times instead of sending the emails at random hours. This system may also be adopted to find an optimized time for end user engagement in other channels such as SMS, WhatsApp™, etc.

FIG. 1 is a flow diagram illustrating a method 100 configured to create and update an end user contact information, according to an embodiment of the present invention. Method 100 may be executed by computing system 400 of FIG. 4. In some embodiments, method 100 includes adding a new end user in an email communication system at S101. For example, when a new end user is created, an input payload is accepted. Input payload includes various contact attributes such as email, name of the end user, gender, phone number, country, etc.

At S102, method 100 extracts contact identification (ID) and email ID values from the input payload. Method 100 may also enrich the data with sender and receiver level information to use as clustering features. This data is fetched from an internal enrichment database 105, for example. In some embodiments, integration with $3^{rd}$ party data enrichment services may also be supported.

Below is an example of enrichment features that may be considered and/or extracted.

TABLE 1

Enrichment Features

| Feature | Explanation |
|---|---|
| Receiver UTC Offset | UTC Offset of the person the email is being sent to |
| Sender Company Sector | Sector of the industry the sender of the email belongs to |
| Receiver Company Sector | The receiver's company sector |
| Receiver Country Code | Country that an email receiver belongs to |
| Receiver Company Country Code | Country that the email receiver company is from |
| Sender Country Code | Sender's country |
| Email is free domain | If the email domain used by the contact belongs to a certain organization or is free of use |

At S103, method 100 uses one or more features listed in Table 1 as input data, and assign a numerical cluster ID to the new end user contact information. This numerical cluster ID and new end user contact information is stored to a mapping database 110.

Figure 3:
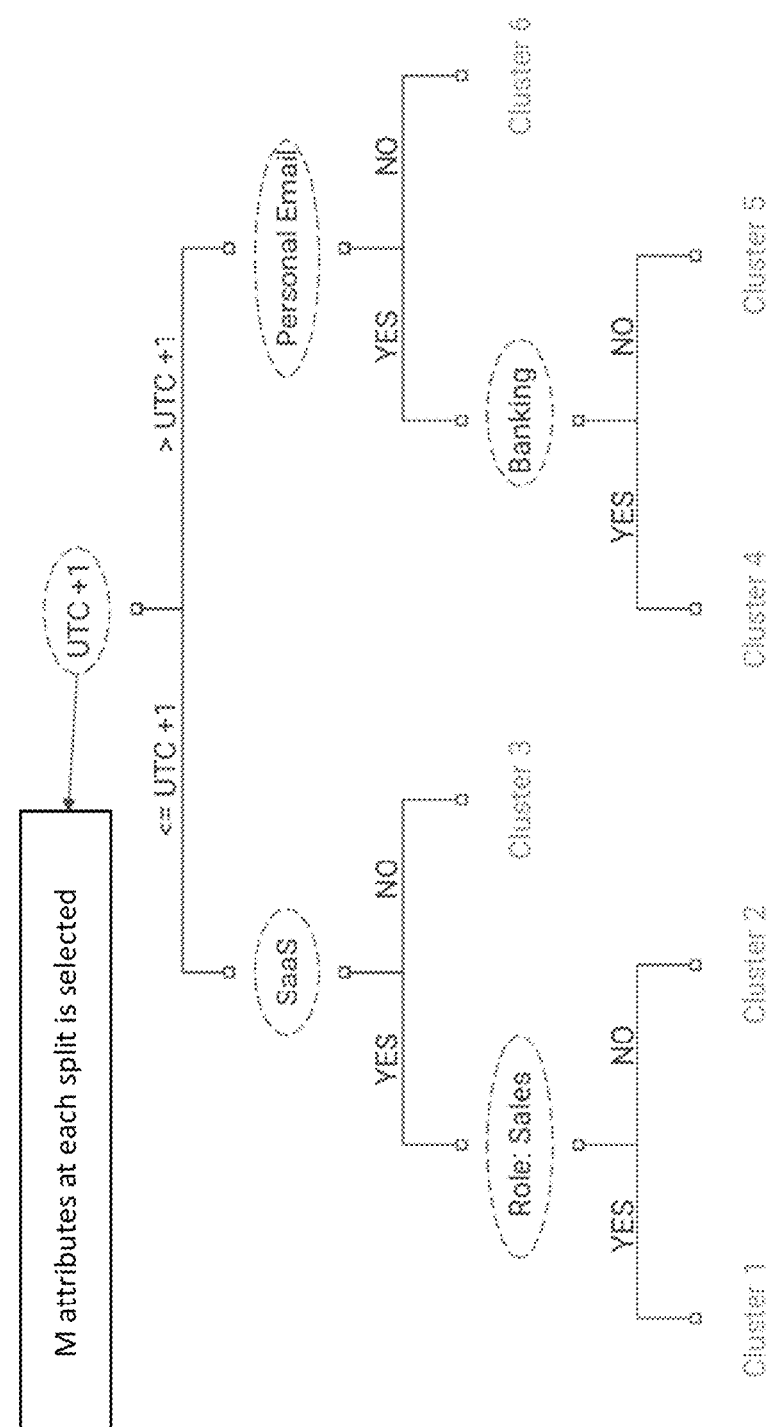
FIG. 3 is a diagram illustrating a decision tree model, according to an embodiment of the present invention.

For clustering purposes, a proprietary tree-based model is used for clustering. See, for example, FIG. 3, which is a diagram illustrating a decision tree model 300, according to an embodiment of the present invention. Decision (or cluster) tree model 300 (of FIG. 3) infers a cluster ID for the new end user contact information.

In some embodiments, a proprietary tree-based approach for clustering is adopted. For example, the tree is inspired from a decision tree, but unlike a decision tree, due to the lack of a distinct class label for each event, the separation between open behavior is used across left and right branch of tree as a measure to pick the best attribute to split upon.

Once the tree is built, a set of clusters is generated, where each cluster has distinct attributes and with significant differences in open behavior over hours. Every contact is assigned to a cluster, expecting that people in the same cluster with similar attributes tend to follow similar open behaviors (FIG. 3), thereby leveraging from the data present at the cluster level.

Returning to FIG. 1, method 100 computes one or more time slots to transmit an email communication for one or more end users at S104 (known as best time). In some embodiments, the one or more time slots are calculated using a reinforcement learning (RL) policy, cluster level rewards, and contact level rewards as inputs. Some embodiments model the above problem of choosing the best send time as a RL problem, particularly as a Multi-Armed Bandit Problem, which are classic ways of illustrating the explore-exploit dilemma in any situation. In the given setting, the Thompson Sampling approach is adopted. The Thompson Sampling approach is heuristics for selecting optimal action in an explore-exploit dilemma. In Thompson Sampling, models are built to estimate the reward probability for each action. Beta Distribution is used to model these reward probabilities. The parameters of this beta distribution are the positive and negative rewards corresponding to the given hour/slot.

Positive Rewards: It is proportional to the total emails that got opened, from the emails that were delivered at a given hour-day.

Negative Rewards: It is proportional to the total emails that went unread, from the total delivered at a given hour-day.

For a given contact, this reward formulation is considered at both the cluster as well as individual contact level. The rewards computed at contact levels are weighted higher than the rewards computed from the cluster. This makes sure that individual user preferences are monitored if they deviate from cluster level behavior in the future.

Combining Customer Level and Contact Level Rewards $$Q_{cluster}(a_{hour}): \frac{1}{B(\gamma, \delta)} x^{(\gamma_{hour}-1)}(1-x)^{(\delta_{hour}-1)} \qquad \text{Equation (1)}$$

$$Q_{contact}(a_{hour}): \frac{1}{B(\alpha, \beta)} x^{(\alpha_{hour}-1)}(1-x)^{(\beta_{hour}-1)} \qquad \text{Equation (2)}$$

$$Q_{final}(a_{hour}): \frac{1}{B(\gamma, \delta)} * \qquad \text{Equation (3)}$$

$$\frac{1}{B(\alpha, \beta)} x^{(w \cdot \gamma_{hour} + \alpha_{hour}-1)}(1-x)^{(w \cdot \delta_{hour} + \beta_{hour}-1)}$$

where w is a weighing factor to be given to contact level reward, $\gamma$, $\alpha$, $\beta$, and $\delta$: are reward parameters associated with each hour, Q is the success probability, a is picking a given hour/arm, and B is Gamma Function Select Best Action $$\pi(a') = \mathrm{argmax}_{a \subseteq A} Q(a_\theta) \qquad \text{Equation (4)}$$

$$\theta'_{t+1} \leftarrow \theta'_t \qquad \text{Equation (5)}$$

(Update the Parameters for selected action based upon received reward) where $\pi$ is a policy for selecting the optimal hour/arm, $\theta$ is a parameter associated with each arm, A is action Space, S is current State, and a' is an optimal Action.

It should be noted that cluster level rewards may be retrieved from cluster level rewards database 115.

In one example, for each day, 4 slots may be selected across each 6-hour window and ordered in descending order of significance. As a result, method 100 may generates a vector of 28 values. These values range from 0 to 167, which represents the hour number as per time zone. From this, the best vector of the 28 values is stored in a send time optimization (STO) predictions database 120. For example, 28 times slots (i.e., 4 slots per day) may be predicted and stored in STO predictions database 120.

In some embodiments, method 100 may continue at S5 with updating existing end user information. For example, whenever an existing contact is updated, method 100 at S6 determines if the primary email, time zone, or country, are being updated. This is not the only attributes that are considered, but are listed for example purposes only. When method 100 determines there is an update, method 100 returns to S2.

Otherwise, method 100 continues at S7 to unsubscribe the end user or deleting the end user from further campaigns. This may occur when the end user updates end user information by selecting 'unsubscribe'. At S8, method 100 deletes all associated data with respect to the end user in cluster mapping database 110 and STO predictions database 120.

Figure 2:
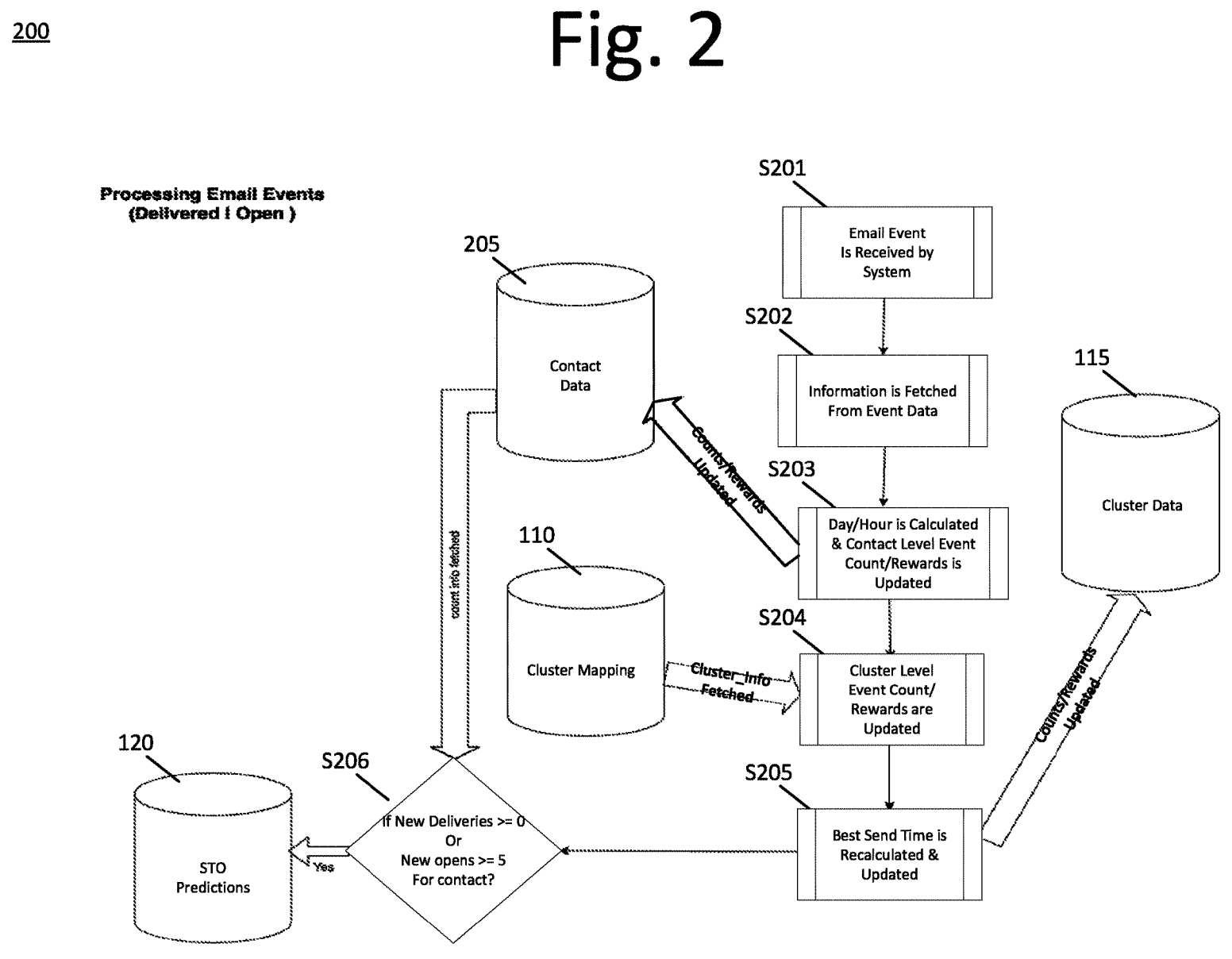

FIG. 2 is a flow diagram illustrating a method 200 for updating a recommended send time for email addresses associated with one or more end users, according to an embodiment of the present invention. In some embodiments, method 200 begins at S201 when an email event occurs. For example, an email event may occur when an email is delivered or opened by an end user.

At S202, from the email event, method 200 includes extracting the end user contact information and an event type (i.e., type of event that occurred) from the payload. For purposes of explanation, payload may be an email meta information payload. This allows information regarding the opening of the email to be retrieved, and also for which contact the information pertains to.

At S203, method 200 the day and hour are calculated and the event count and rewards are updated in contact data database 205. In this embodiment, method 200 includes calculating day/hour number (e.g., [0 . . . 167]) from an event timestamp value. The count and rewards of respective event hour in the contact data database 105. In one example, suppose event type is delivered event, the total delivery counts and positive/negative rewards for a given hour are updated. More specifically, during the "delivered event", only the delivery counts associated with hours are updated, while the rewards and open count are updated at "open event". This approach may be extended to update rewards associated with hours at both delivery as well as the opening of emails. Otherwise, total open counts and positive rewards are updated.

It should be appreciated that reward computation is an essential part of the workflow when making predictions for the best send time. In an embodiment, two positive reward systems are used in computation:

one for the hour of delivery of an email and the other for the hour of open of an email. Each opening of an email leads to increase in positive rewards for both the delivered as well as the open hour.

the positive rewards for delivered hours are reduced as the time to open increases, because as we move forward in time, the effect of email delivery hours on its opening is less likely. Reward for open hours is increased as the time passes.

At S204, method 200 include retrieving cluster information from cluster mapping database 110 and cluster level event count and rewards are updated in cluster data database 115. At S205, method 200 determines if new deliveries are greater than or equal to 10 or new opens for contact are greater than or equal to 5. It should be noted that these values are listed for explanation purposes only, and can be configured with any number of deliveries or openings. If so, at S206, method 200 includes recalculating best send time and updating STO prediction database 120.

Figure 4:
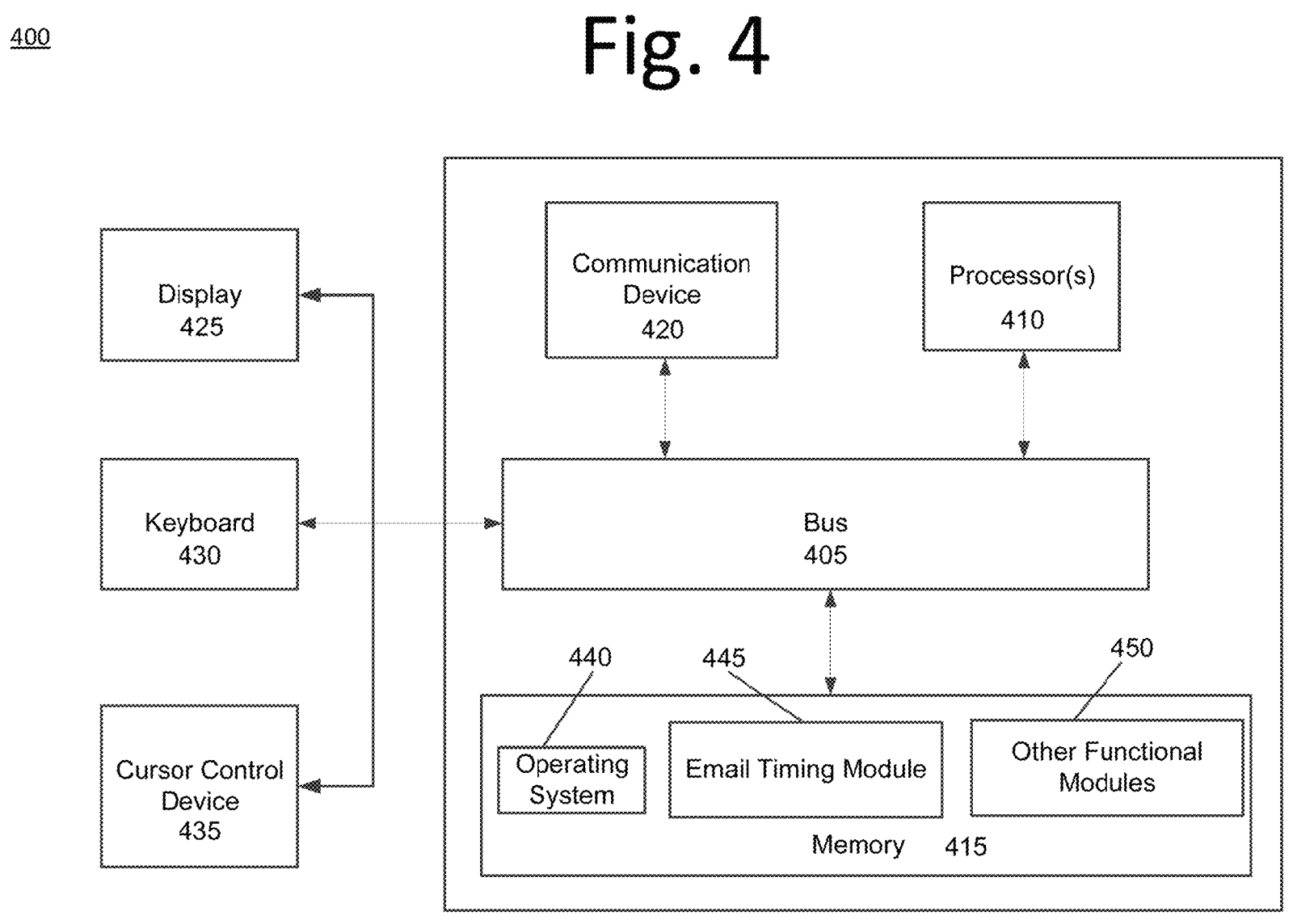

FIG. 4 is an architectural diagram illustrating a computing system 400 configured to determine the best time to send an email communication to an end user, according to an embodiment of the present invention. In some embodiments, computing system 400 may be one or more of the computing systems depicted and/or described herein. Computing system 400 includes a bus 405 or other communication mechanism for communicating information, and processor(s) 410 coupled to bus 405 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 410 may also have multiple processing cores, and at least some of the cores may be configured to perform specific functions. Multi-parallel processing may be used in some embodiments. In certain embodiments, at least one of processor(s) 410 may be a neuromorphic circuit that includes processing elements that mimic biological neurons. In some embodiments, neuromorphic circuits may not require the typical components of a Von Neumann computing architecture.

Computing system 400 further includes a memory 415 for storing information and instructions to be executed by processor(s) 410. Memory 415 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 410 and may include volatile media, non-volatile media, or both. The media may also be removable, non-removable, or both.

Additionally, computing system 400 includes a communication device 420, such as a transceiver, to provide access to a communications network via a wireless and/or wired connection. In some embodiments, communication device 420 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 410 are further coupled via bus 405 to a display 425, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 425 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 430 and a cursor control device 435, such as a computer mouse, a touchpad, etc., are further coupled to bus 405 to enable a user to interface with computing system.

However, in certain embodiments, a physical keyboard and mouse may not be present, and the user may interact with the device solely through display 425 and/or a touchpad (not shown). Any type and combination of input devices may be used as a matter of design choice. In certain embodiments, no physical input device and/or display is present. For instance, the user may interact with computing system 400 remotely via another computing system in communication therewith, or computing system 400 may operate autonomously.

Memory 415 stores software modules that provide functionality when executed by processor(s) 410. The modules include an operating system 540 for computing system 400. The modules further include a email timing module 445 that is configured to perform all or part of the processes described herein or derivatives thereof. Computing system 400 may include one or more additional functional modules 450 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 5:
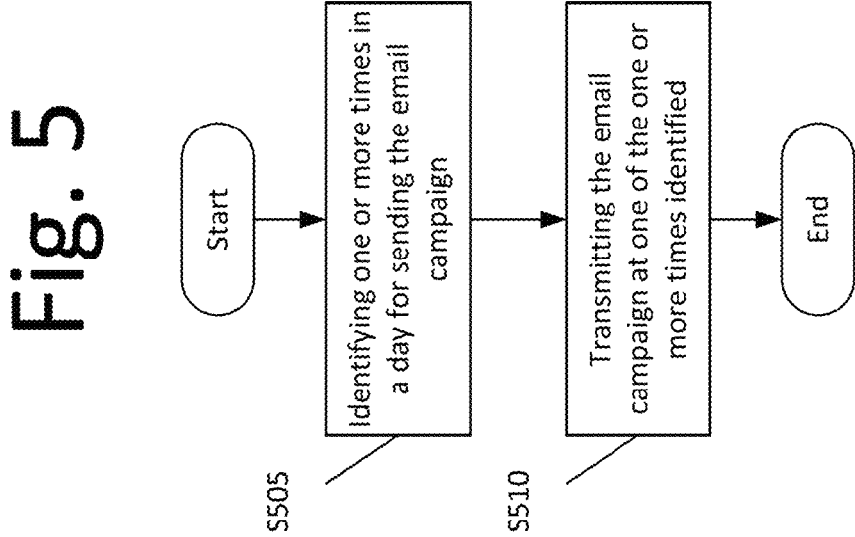
FIG. 5 is a flow diagram illustrating a method for predicting an optimized send time for one or more end users in an email campaign, according to an embodiment of the present invention.

FIG. 5 is a flow diagram illustrating a method 500 for predicting an optimized send time for one or more end users in an email campaign, according to an embodiment of the present invention. In some embodiments, method 500 is configured to be executed by computing system 400 of FIG. 4. Method 500 may begin at S505 with identifying one or more times in a day for sending the email campaign to the one or more end users. At S510, method 500 includes transmitting the email campaign at one of the one or more times identified to the one or more end users.

The process steps performed in FIGS. 1, 2, and 5 may be performed by a computer program, encoding instructions for the processor(s) to perform at least part of the process(es) described in FIGS. 1, 2, and 5, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 410 of computing system 400 of FIG. 4) to implement all or part of the process steps described in FIGS. 1, 2, and 5, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for predicting an optimized send time for one or more end users in an email campaign, the method comprising:

generating a set of clusters after a decision tree model is built;

assigning the one or more end users to one or more clusters in the set of clusters based on open behaviors of the one or more end users;

identifying one or more times in a day for sending the email campaign to the one or more end users, the identifying of the one or more times comprising computing one or more time slots to transmit the email campaign to an end user of the one or more end users, the computing of the one or more time slots comprising:

building a reward probability for each action of one or more actions pertaining to transmitting the email campaign to the one or more end users, calculating a reward probability at a cluster level and at an individual contact level, and assigning a greater weight to the reward probability at the individual contact level and a lower weight to the reward probability at the cluster level; and transmitting the email campaign at one of the one or more times identified to the one or more end users.

2. The method of claim 1, further comprising:

adding a new end user in an email communication system responsive to the new end user being created; and accepting an input payload associated with the new end user responsive to the new end user being created.

3. The method of claim 2, further comprising:

extracting contact identification and email identification associated with the new end user from the input payload; and enriching the extracted contact identification and the email identification with sender and receiver level information to use as clustering features.

4. The method of claim 3, further comprising:

using one or more features as input data;

assigning a numerical cluster identification to the new end user; and mapping the numerical cluster identification and the contact identification to a mapping database.

5. The method of claim 1, wherein computing the one or more time slots comprises:

using a reinforcement learning (RL) policy, cluster level rewards, and contact level rewards as inputs while computing the one or more time slots.

6. The method of claim 1, further comprising:

selecting from the one or more computed time slots an optimal time to send the email campaign to the new end user; and storing the optimal time in a prediction database.

7. A system configured to predict an optimized send time for one or more end users in an email campaign, the system comprising:

memory comprising a set of instructions; and at least one processor, wherein the set of instructions are configured to cause at least one processor to execute:

generating a set of clusters after a decision tree model is built;

assigning the one or more end users to one or more clusters in the set of clusters based on open behaviors of the one or more end users;

identifying one or more times in a day for sending the email campaign to the one or more end users, the identifying of the one or more times comprising computing one or more time slots to transmit the email campaign to an end user of the one or more end users, the computing of the one or more time slots comprising:

building a reward probability for each action of one or more actions pertaining to transmitting the email campaign to the one or more end users, calculating a reward probability at a cluster level and at an individual contact level, and assigning a greater weight to the reward probability at the individual contact level and a lower weight to the reward probability at the cluster level; and transmitting the email campaign at one of the one or more times identified to the one or more end users.

8. The system of claim 7, wherein the set of instructions are further configured to cause at least one processor to execute:

adding a new end user in an email communication system responsive to the new end user being created; and accepting an input payload associated with the new end user responsive to the new end user being created.

9. The method of claim 8, wherein the set of instructions are further configured to cause at least one processor to execute:

extracting contact identification and email identification associated with the new end user from the input payload; and enriching the extracted contact identification and the email identification with sender and receiver level information to use as clustering features.

10. The method of claim 9, wherein the set of instructions are further configured to cause at least one processor to execute:

using one or more features as input data;

assigning a numerical cluster identification to the new end user; and mapping the numerical cluster identification and the contact identification to a mapping database.

11. The method of claim 7, wherein the set of instructions are further configured to cause at least one processor to execute:

using a reinforcement learning (RL) policy, cluster level rewards, and contact level rewards as inputs while computing the one or more time slots.

12. The method of claim 7, wherein the set of instructions are further configured to cause at least one processor to execute:

selecting from the one or more computed time slots an optimal time to send the email campaign to the new end user; and storing the optimal time in a prediction database.

13. A non-transitory computer-readable medium comprising a computer program to predict an optimized send time for one or more end users in an email campaign, wherein the computer program is configured to cause at least one processor to execute:

generating a set of clusters after a decision tree model is built;

assigning the one or more end users to one or more clusters in the set of clusters based on open behaviors of the one or more end users;

identifying one or more times in a day for sending the email campaign to the one or more end users, the identifying of the one or more times comprising computing one or more time slots to transmit the email campaign to an end user of the one or more end users, the computing of the one or more time slots comprising:

building a reward probability for each action of one or more actions pertaining to transmitting the email campaign to the one or more end users, calculating a reward probability at a cluster level and at an individual contact level, and assigning a greater weight to the reward probability at the individual contact level and a lower weight to the reward probability at the cluster level; and transmitting the email campaign at one of the one or more times identified to the one or more end users.

14. The non-transitory computer-readable medium of claim 13, wherein the computer program is further configured to cause at least one processor to execute:

adding a new end user in an email communication system responsive to the new end user being created; and accepting an input payload associated with the new end user responsive to the new end user being created.

15. The non-transitory computer-readable medium of claim 14, wherein the computer program is further configured to cause at least one processor to execute:

extracting contact identification and email identification associated with the new end user from the input payload; and enriching the extracted contact identification and the email identification with sender and receiver level information to use as clustering features.

16. The non-transitory computer-readable medium of claim 15, wherein the computer program is further configured to cause at least one processor to execute:

using one or more features as input data;

assigning a numerical cluster identification to the new end user; and mapping the numerical cluster identification and the contact identification to a mapping database.

17. The non-transitory computer-readable medium of claim 16, wherein the computer program is further configured to cause at least one processor to execute:

using a reinforcement learning (RL) policy, cluster level rewards, and contact level rewards as inputs while computing the one or more time slots.

18. The non-transitory computer-readable medium of claim 17, wherein the computer program is further configured to cause at least one processor to execute:

selecting from the one or more computed time slots an optimal time to send the email campaign to the new end user; and storing the optimal time in a prediction database.

* * * * *